United States Patent [19]
Owada et al.

[11] Patent Number: 5,186,297
[45] Date of Patent: Feb. 16, 1993

[54] HYDRAULIC CLUTCH OPERATING APPARATUS

[75] Inventors: Toshinobu Owada; Akio Inamori; Yoshikazu Aota; Shigeo Sakamoto; Seiichi Takahashi, all of Sakai, Japan

[73] Assignee: Kubota Corporation, Osaka, Japan

[21] Appl. No.: 820,828

[22] Filed: Jan. 15, 1992

[30] Foreign Application Priority Data

| Mar. 25, 1991 | [JP] | Japan | 3-60517 |
| Mar. 25, 1991 | [JP] | Japan | 3-60518 |
| Mar. 25, 1991 | [JP] | Japan | 3-60521 |
| Jul. 12, 1991 | [JP] | Japan | 3-54323[U] |
| Jul. 12, 1991 | [JP] | Japan | 3-172782 |
| Jul. 12, 1991 | [JP] | Japan | 3-172783 |

[51] Int. Cl.$^5$ .............................. F16D 25/08
[52] U.S. Cl. ........................ 192/85 CA; 192/91 A; 192/109 F
[58] Field of Search ............ 192/85 CA, 91 A, 98, 192/109 A, 109 F, 30 V

[56] References Cited

U.S. PATENT DOCUMENTS

| 3,904,008 | 9/1975 | Sonnerat | 192/98 |
| 3,921,775 | 11/1975 | Matyschik | 192/98 |
| 4,228,881 | 10/1980 | Nakamura | 192/98 |
| 4,565,272 | 1/1986 | Miyahara | 192/98 |
| 4,585,109 | 4/1986 | Shirley et al. | 192/85 CA |
| 4,633,993 | 1/1987 | Limbacher et al. | 192/85 CA X |
| 4,660,702 | 4/1987 | Flotow | 192/85 CA X |
| 4,684,003 | 8/1987 | Leigh-Monstevens | 192/91 A X |
| 4,869,355 | 9/1989 | Corral et al. | 192/85 CA X |
| 4,938,332 | 7/1990 | Thomas et al. | 192/85 CA |

FOREIGN PATENT DOCUMENTS

WO91/00440 1/1991 World Int. Prop. O. ..... 192/85 CA

Primary Examiner—Rodney H. Bonck
Attorney, Agent, or Firm—Edwin E. Greigg; Ronald E. Greigg

[57] ABSTRACT

A hydraulic operating apparatus includes a release hub for supporting a release bearing, a piston formed separately from the release hub, and an abutting plate disposed between the piston and release hub as a power transmission relay member for absorbing shocks. The abutting plate may itself be formed of an elastic material or may include an elastic element to suppress shocks transmitted between the piston and release hub. The release hub and piston are formed annular, and the release hub is supported slidable on an outer surface of an outer wall section of a cylinder defining an annular piston chamber. The release hub includes a supporting surface having a smaller diameter than the outer wall section for supporting the release bearing.

12 Claims, 9 Drawing Sheets

HYDRAULIC CLUTCH OPERATING APPARATUS

BACKGROUND OF THE INVENTION

1. Field of the Invention

The present invention relates to a hydraulic apparatus for operating a clutch of a vehicle, particularly a tractor.

2. Description of the Related Art

A vehicle such as a tractor has a clutch operating apparatus for operating a main clutch interposed between an engine output shaft and a propeller shaft. This clutch operating apparatus may be a mechanical apparatus or a hydraulic apparatus, the latter including a master cylinder operable by a clutch pedal.

The hydraulic clutch operating apparatus includes an annular piston chamber concentric with the propeller shaft and defined adjacent a stationary supporting wall surrounding the propeller shaft. The piston chamber has an annular piston axially slidably mounted therein. The piston includes a bearing support at a forward end thereof for supporting a release bearing. When the clutch pedal is depressed, pressure oil is supplied from the master cylinder to the piston chamber to slide the piston. As a result, the release bearing pushes release elements to disengage the clutch.

Conventionally, the piston and bearing support are formed integral with each other, and the piston is mounted in the piston chamber with appropriate inner and outer spaces therebetween. These inner and outer spaces are sealed by oil seals.

Where the release elements of the clutch are the lever type, a plurality of release levers are arranged circumferentially. The release bearing pushes inward ends of the release levers to produce a half-clutch state or declutched state.

However, it is extremely difficult due to variations occurring during manufacture and for other reasons to arrange all of the inward ends of the release levers in the same plane or axially flush with one another. Consequently, when in a half-clutch state, one or more of the plurality of release levers may remain out of contact with the release bearing, thereby to produce an uneven contact state.

In such an uneven contact state, the release bearing tends to make an eccentric movement instead of smoothly rotating about the axis of the propeller shaft. Such movement of the release bearing is transmitted through the bearing support to the piston. As a result, the piston makes an unsteady axial movement in the cylinder chamber to cause pressure variations. In a half-clutch state, oil leakage could also occur due to wear or damage of the oil seals.

To avoid direct transmission from the bearing support to the piston of displacement due to the eccentric movement, the bearing support and piston may simply be divided as disclosed in U.S. Pat. Nos. 4,684,003 and 4,660,702. Although vibrations transmitted directly through solids may be stopped at the dividing point, this construction is insufficient for suppressing vibratory shocks due to the eccentric movement of the release bearing, and for allowing steady sliding movement of the bearing support.

SUMMARY OF THE INVENTION

An object of the present invention is to provide a hydraulic operating apparatus for preventing the eccentric movement of the release bearing from being transmitted to the piston when the release elements make uneven contact with the release bearing, thereby to avoid the pressure variations as well as wear and damage of the oil seals noted above.

Another object of the present invention is to suppress vibratory shocks transmitted from the bearing support to the piston, thereby to assure a steady sliding movement of the bearing support.

In order to achieve the above objects, the present invention provides a hydraulic operating apparatus including a release bearing supported by a release hub divided from a piston, and an abutting plate disposed between the piston and release hub as a power transmitting relay member for absorbing shocks. In this construction, although the release hub makes an eccentric movement due to an uneven contact between the release bearing and release elements in a half-clutch state or the like, the eccentric movement is not transmitted directly to the piston since the release hub supporting the release bearing is divided from the piston. Furthermore, the abutting plate disposed between the piston and release hub, by virtue of its own elasticity, suppresses shocks transmitted between the piston and release hub. To increase the shock suppressing effect, the abutting plate preferably is formed of spring steel or an elastic element is mounted on the abutting plate.

To realize steady sliding movement of the bearing support, a hydraulic operating apparatus according to the present invention has a release bearing supported by a release hub divided from a piston, the release hub being supported slidable on an outer surface of an outer wall section of a cylinder defining an annular piston chamber. In this construction, the release hub has an increased sliding area in addition to the effect of dividing the release hub from the piston. Consequently, the invention realizes a stable clutch operation.

Other features and advantages of the invention will be apparent from the dependent claims and from the following description of the preferred embodiments to be had with reference to the drawings.

DETAILED DESCRIPTION OF THE PREFERRED EMBODIMENTS

Figure 1:
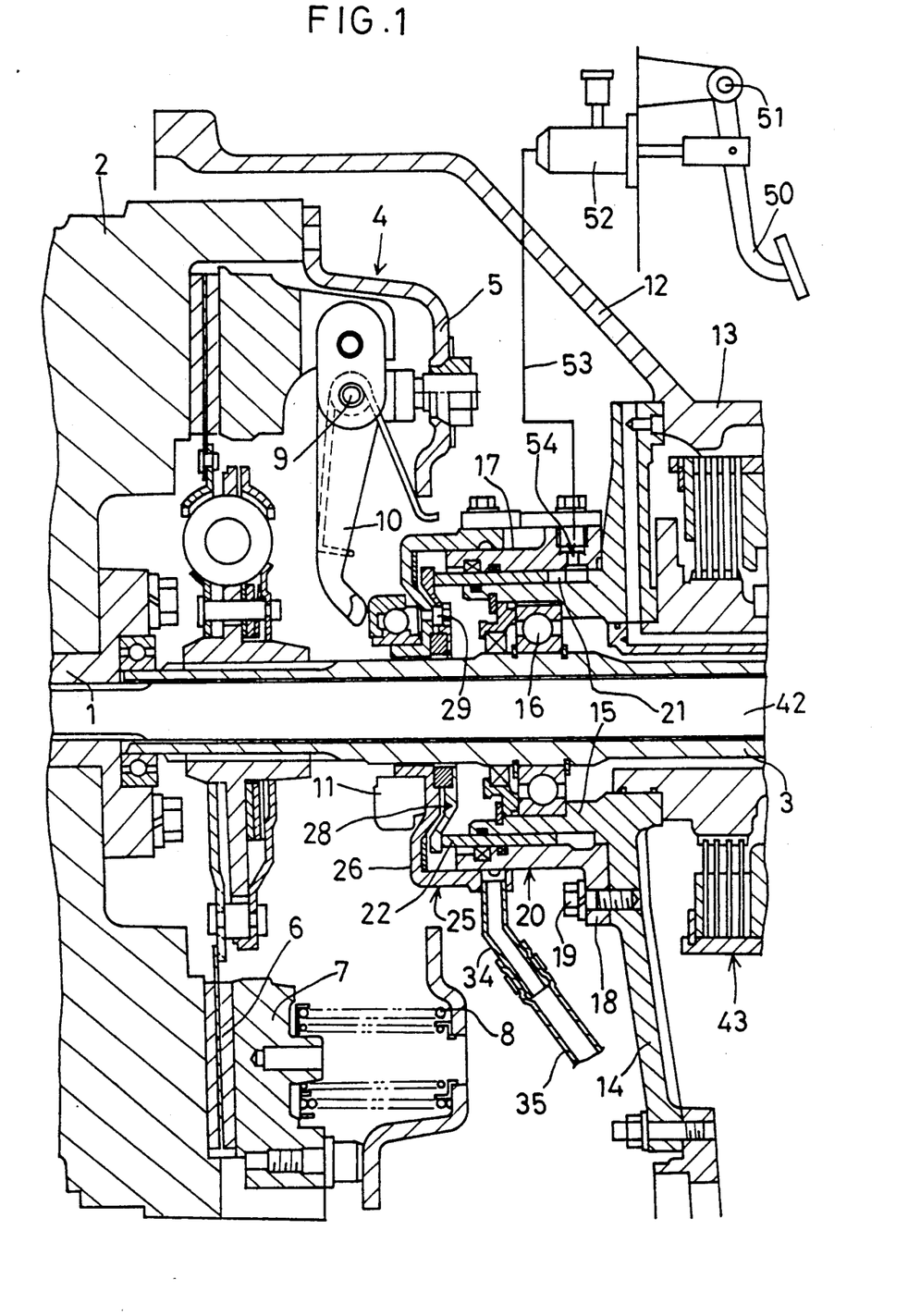
FIG. 1 is a view in vertical section of a hydraulic clutch operating apparatus according to the present invention.
Figure 2:
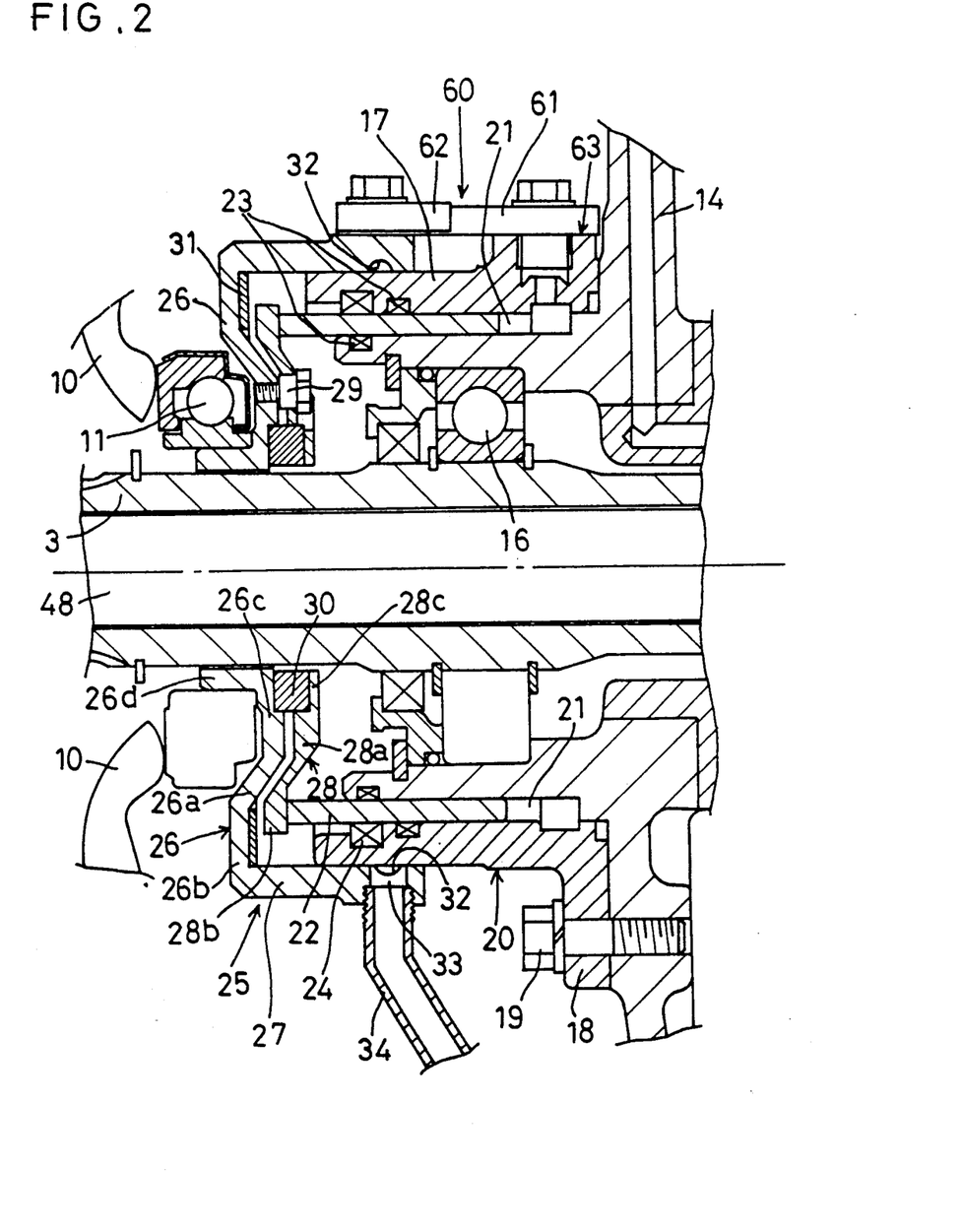
FIG. 2 is an enlarged sectional view of the hydraulic clutch operating apparatus shown in FIG. 1.

FIG. 1 shows a first embodiment of the present invention. In FIGS. 1 and 2, numeral 1 denotes an engine output shaft, and numeral 2 a flywheel fixed to the output shaft 1. Numeral 3 denotes a propelling shaft forming part of a vehicle propelling system and connected to the engine output shaft 1 through a dry type single disc clutch 4.

The clutch 4 includes a clutch cover 5 fixed to the flywheel 2, a clutch disc 6 splined to the propeller shaft 3, a pressure plate 7 for sandwiching the clutch disc 6 with the flywheel 2, coil springs 8 disposed between the clutch cover 5 and pressure plate 7 to urge the pressure plate 7 toward the flywheel 2, and a plurality of release levers (release elements) 10 pivotally supported by the clutch cover 5 through pins 9. The release levers 10 are arranged in the circumferential direction. When inward ends of the release levers 10 are pushed by a release bearing 11, the pressure plate 7 moves rearwardly against the force of coil springs 8, thereby placing the clutch 4 in a half-clutch state or a disengaged state.

Numeral 12 denotes a clutch housing, and numeral 13 a transmission case, which are partitioned by a stationary supporting wall 14. The supporting wall 14 includes an inner sleeve portion 15 surrounding the propeller shaft 3 and supporting the propeller shaft 3 through a bearing 16. Numeral 17 denotes an outer sleeve fitted around the inner sleeve portion 15 and having a flange 18 fixed to the supporting wall 14 through bolts 19.

The inner sleeve portion 15 and outer sleeve 17 constitute a cylinder 20, and define an annular piston chamber 21 therebetween which is concentric with the propeller shaft 3. The piston chamber 21 has an annular piston 22 axially slidably mounted therein. Slight spaces are formed inside and outside the piston 22, and these spaces are sealed by oil seals 23 and a dust seal 24.

Numeral 25 denotes a tubular release hub having a bottom wall 26 and a peripheral wall 27. The peripheral wall 27 has an inside surface axially slidably contacting an outer surface of the outer sleeve 17 of the cylinder 20. The bottom wall 26 has an inward portion curved toward the piston 22 to define a step 26a. Further, the bottom wall 26 includes a bearing support 26d defined adjacent the propeller shaft 3 and extending therealong toward the clutch 4. The release bearing 11 is fitted on this bearing support 26d. Part of the release bearing 11 extends into a space defined by the step 26a and bearing support 26d.

Numeral 28 denotes an abutting plate disposed between the bottom wall 26 of the release hub 25 and the piston 22. The abutting plate 28 includes an outer edge 28b, an inner edge 28c and a step 28a in opposed relations to an outer edge 26b, an inner edge 26c and the step 26a of the bottom wall 26. The abutting plate 28 is axially slidably supported by a plurality of bolts 29 arranged circumferentially and screwed to the bottom wall 26. An annular first elastic element 30 such as rubber is mounted in a pressurized state (e.g. about 100 kg/cm$^2$) between the respective inner edges 26c and 28c of the bottom wall 26 and abutting plate 28. The outer edge 28b of the abutting plate 28 is in contact with a forward end of the piston 22. The outer edge 26b of the bottom plate 26 carries a second elastic element 31 such as rubber which is contacted by the outer edge 28b when the first elastic element 30 is compressed by the abutting plate 28. Both of the elastic elements 30 and 31 are annular and mounted concentrically.

In FIG. 1, numeral 50 denotes a clutch pedal pivotally supported through a pin 51. When the clutch pedal 50 is depressed, pressure oil is supplied from a master cylinder 52 to the piston chamber 21 through piping 53 and an oil passage 54. Numeral 42 denotes a PTO drive shaft directly coupled to the output shaft 1, and numeral 43 denotes a hydraulic clutch of the propelling system.

Figure 3:
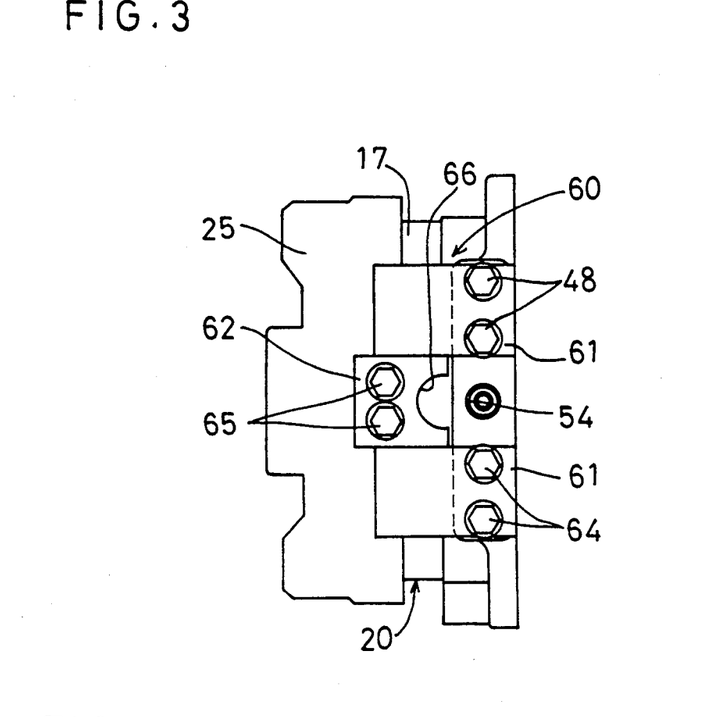
FIG. 3 is a plan view of a rotation stopper mechanism of the hydraulic clutch operating apparatus.

FIG. 2 shows a rotation stopper mechanism 60 disposed above the outer sleeve 17 and release hub 25 for preventing rotation of the release hub 25. As shown in greater detail in FIG. 3, the rotation stopper mechanism 60 includes a pair of stationary plates 61 fixed to the outer sleeve 17, and a restrictor plate 64 disposed between the stationary plates 61 and fixed to the release hub 25. The stationary plates 61, respectively, are fixed by two bolts 64 to mounting seats 63 defined in proximal upper positions of the outer sleeve 17, to extend axially at opposite sides of the oil passage 54. The restrictor plate 64 is axially slidably fitted between the stationary plates 61, and fixed to the release hub 25 by two bolts 65. The restrictor plate 64 is cut out as at 66 not to interfere with a joint coupling the piping 53 to the oil passage 54.

The release hub 25 has a circumferential groove 32 defined in a rearward position on an inside peripheral wall thereof to collect pressure oil leaking from the piston chamber 21 through inner and outer walls of the piston 22. Further, the release hub 25 has a drain hole 33 defined in a lower position thereof and communicating with the circumferential groove 32. The drain hole 33 is communicating also with a tube fitting 34 screwed to the release hub 25. The tube fitting 34 is bent rearwardly at a lower position thereof, and connected to a flexible drain tube 35.

Figure 4:
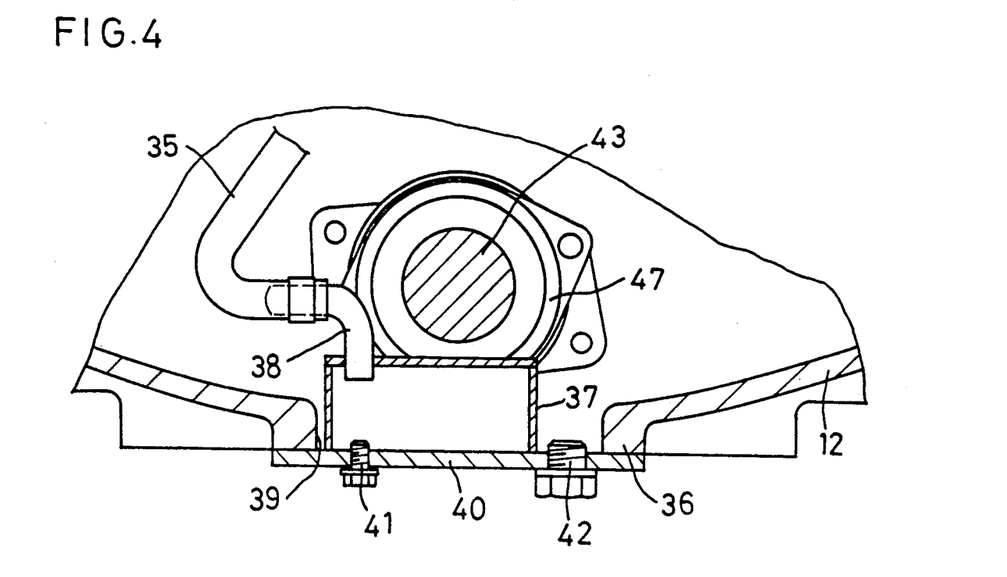
FIG. 4 is a view in cross section of a lower portion of a clutch housing accommodating the hydraulic clutch operating apparatus.
Figure 5:
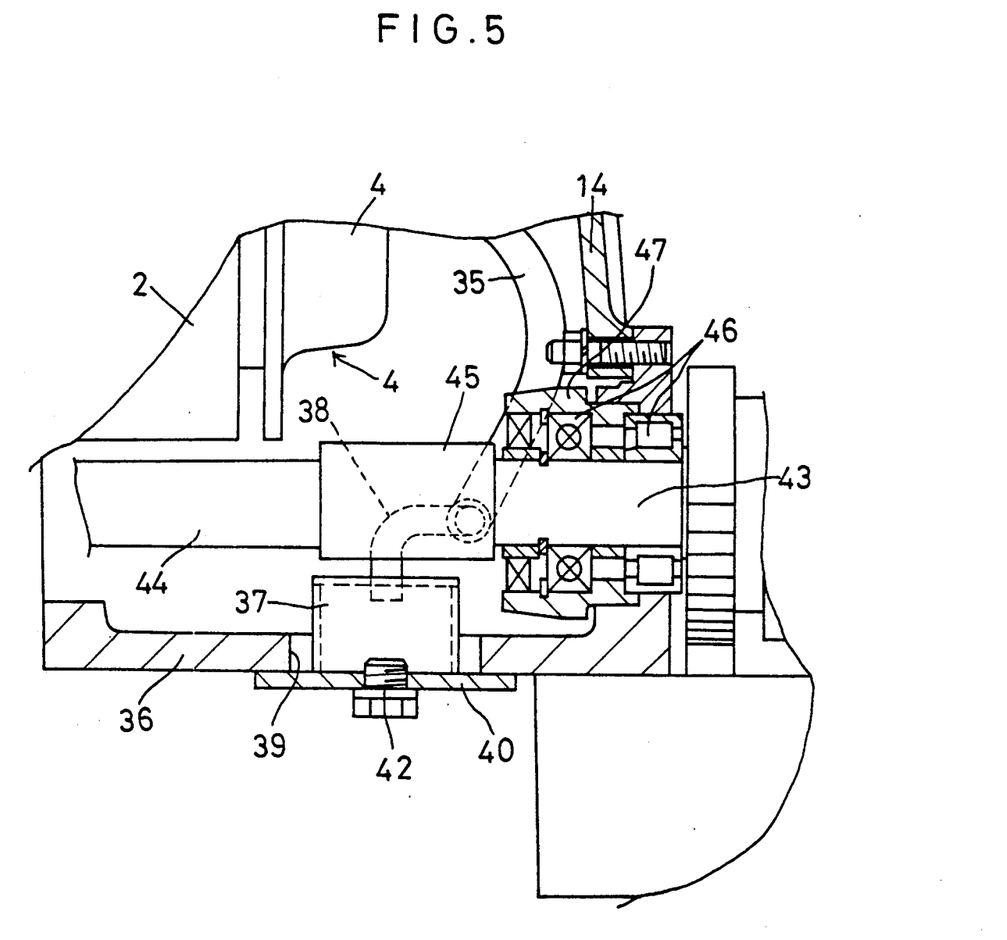
FIG. 5 is a view in vertical section of the lower portion of the clutch housing.

The drain tube 35 extends downwardly to lead the oil leaking from the piston chamber 21 to a lower position of the clutch housing 12. As shown in FIGS. 4 and 5, the drain tube 35 has a lower end thereof connected through a tube fitting 38 to an oil vessel 37 supported by a bottom wall 36 of the clutch housing 12. The oil vessel 37 is mounted on a bottom lid 40 removably attached to the bottom wall 36 of the clutch housing 12 to close an opening 39 of the bottom wall 36. Two drain plugs 41 and 42 are removably screwed to the bottom lid 40, one plug 41 being located inside the oil vessel 37 and the other 42 outside.

As shown in FIGS. 4 and 5, the tube fitting 38 of the oil vessel 37 is curved outwardly adjacent one side of the oil vessel 37 not to interfere with front wheel driving transmission shafts 43 and 44 and a coupling 45. The transmission shaft 43 is supported by a partition wall through a bearing 46 and a bearing case 47. The transmission shaft 44 extends below the clutch 4 longitudinally of the vehicle.

According to the above construction, when the clutch pedal 50 is depressed, pressure oil is supplied from the master cylinder 52 to the piston chamber 21, whereby the piston 22 moves forward into contact with the abutting plate 28. With further forward movement of the piston 22, the bottom wall 26 of the release hub 25, which is connected to the abutting plate 28 through the bolts 29 defining shanks to be slidable by a predetermined amount relative to the abutting plate 28, is pushed forward by the abutting plate 28 through the elastic elements 30 and 31. As a result, the release bearing 11 pushes forward the inward ends of the release levers 10, to place the clutch 4 in a half-clutch state or a disengaged state.

At this time, the release bearing 11 makes eccentric movement if the plurality of release levers 10 unevenly contact the release bearing 11. However, the eccentric movement of the release bearing 11 is not transmitted directly to the piston 22 since the release hub 25 is divided from the piston 22 and disposed outwardly of the outer sleeve 17. In other words, the eccentric movement is absorbable by the release hub 25.

In the half-clutch state, the first elastic element 30 is compressed and the second elastic element 31 is not contacted by the abutting plate 28. Consequently, even when the release hub 25 is moved by the eccentric movement of the release bearing 11, the movement of the release hub 25 may be absorbed by elastic deformation of the first elastic element 30.

Thus, steady movement of the piston 22 is assured which avoids pressure variations in the piston chamber 21, wear and damage of the oil seals, pressure oil leakage to the interior of the clutch housing 12 and resulting slippage of the clutch 4.

When disengaging the clutch 4, the first elastic element 30 is compressed further, and the abutting plate 28 contacts the second elastic element 31. As a result, the release hub 25 is pushed by the abutting plate 28 through the elastic elements 30 and 31 to disengage the clutch 4 reliably.

The second elastic element 31 is attached to the bottom wall 26 of the release hub 25, whereby its area of attachment is larger than where the elastic element 31 is attached to the abutting plate 28. Thus, the second elastic element 31 may be attached reliably by bonding or the like without becoming peeled.

The bottom wall 26 of the release hub 25 has the inner edge 26c projecting inwardly of the piston 22 relative to the outer edge 26b. The release bearing 11 is mounted on the bearing support 26d integral with the inner edge 26c. This arrangement allows part of the release bearing 11 to be located closer than an end face of the bottom wall 26 to the piston 22. As a result, sufficient fitting areas are secured for the piston 22 and release hub 25 with respect to the cylinder 20. Thus, the piston 22 and release hub 25 have increased stability while reducing the overall axial dimension.

The pressure oil may leak from the piston chamber 21 through the inner and outer oil seals 23 and 24 of the piston 22. The leaking oil is received by the bottomed release hub 25 surrounding the cylinder 20. Then, the oil is collected through the circumferential groove 32 in the inside wall of the release hub 25 into the drain hole 33, from which the oil flows through the tube fitting 34, drain tube 35 and tube fitting 38 into the oil vessel 37. Since the oil leaking from the piston chamber 21 all flows into the oil vessel 37 without scattering in the clutch housing 12. Thus, the clutch 4 may be maintained in a desirable condition free from the oil adhering to the clutch 4.

The oil collected in the oil vessel 37 may readily be removed therefrom by detaching the drain plug 41.

However, the oil vessel 37 is dispensable, and a recess may be formed in the bottom of the clutch housing 12, instead, for storing the oil.

Figure 6:
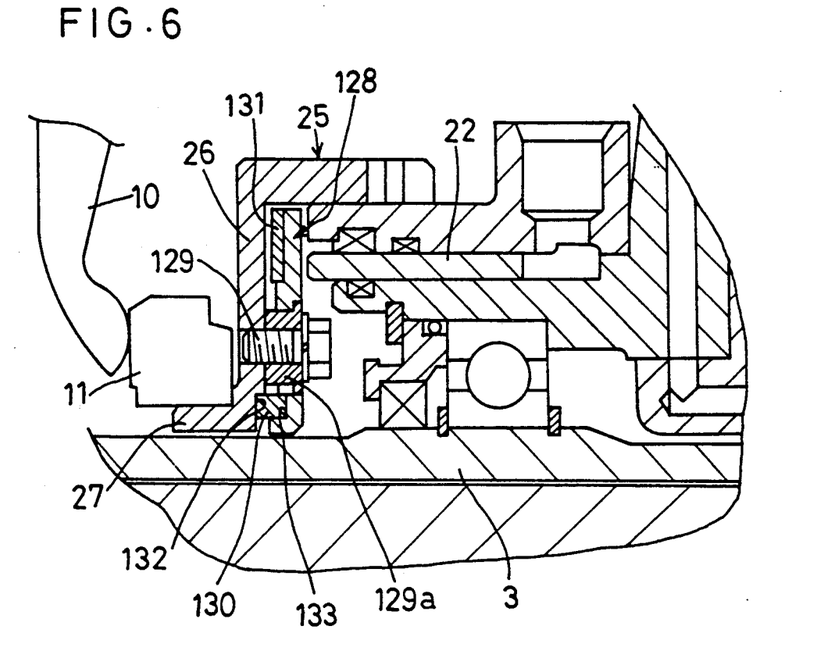
FIG. 6 is a view in vertical section showing a modified contact between a release hub and abutting plate.
Figure 7:
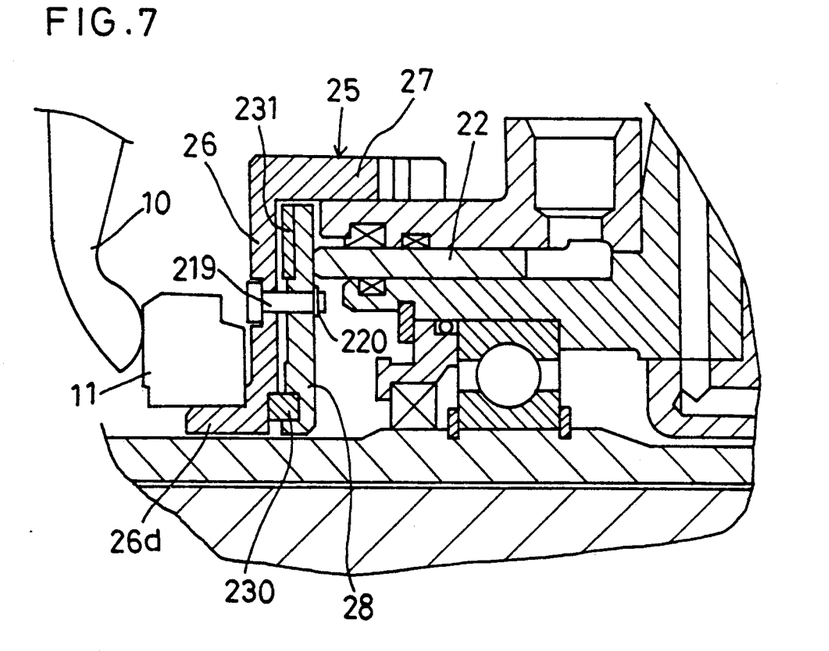
FIG. 7 is a view in vertical section showing another modified contact between the release hub and abutting plate.
Figure 8:
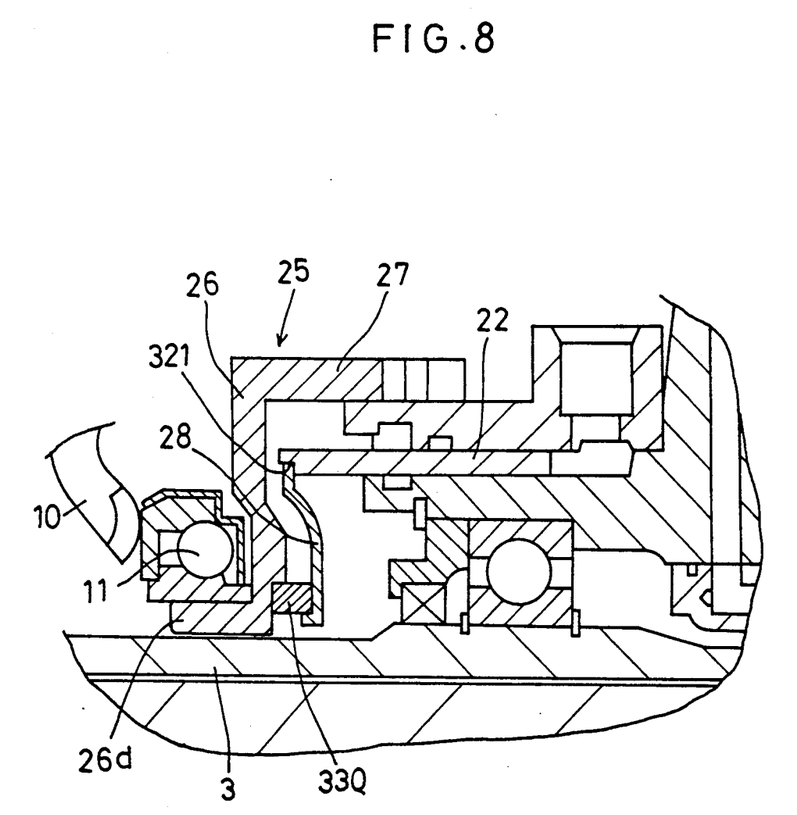
FIG. 8 is a view in vertical section showing a further modified contact between the release hub and abutting plate.

FIGS. 6 through 8 shown modified constructions for relatively displaceably connecting the release hub and abutting plate.

In FIG. 6, an annular, substantially flat abutting plate 128 is disposed between the piston 22 and a substantially flat bottom wall 26 of the release hub 25. The abutting plate 28 is axially slidably supported by a plurality of stepped collars 129a arranged circumferentially and secured to the bottom wall 26 by bolts 129. The abutting plate 28 carries annular outer elastic element 130 and inner elastic element 131, which are compressible between the abutting plate 28 and the bottom wall 26 of the release hub 25 to damp shocks when the piston 22 contacts and pushes the abutting plate 28.

The inner elastic element 130 has a greater axial dimension than the outer elastic element 131, and is mounted in a pressurized state (e.g. about 100 kg/cm$^2$) between a step 132 formed on the wall 26 and an annular groove 133 formed in the abutting plate 28. The outer elastic element 131 has a radially extended area, and is bonded to the abutting plate 28 to be spaced from the wall 26. The elastic elements 130 and 131 are formed of rubber or the like.

In FIG. 7, the abutting plate 28 is supported through headed pins 219 instead of the bolts 119 and collar 130. The pins 219 are slidably inserted through bores formed in the wall 26 and abutting plate 28 to extend from the wall 26 to the abutting plate 28, with retainer rings 220 fitted on projecting ends of the pins 219.

In FIG. 8, only an inner elastic element 330 is mounted, with no outer elastic element provided. The bolts 119 and headed pins 219 are also omitted. The abutting plate 28 is engaged with a recess 321 formed in the forward end of the piston 22. This construction is suited where only minor shocks occur from the contact between the release hub 25 and abutting plate 28.

Figure 9:
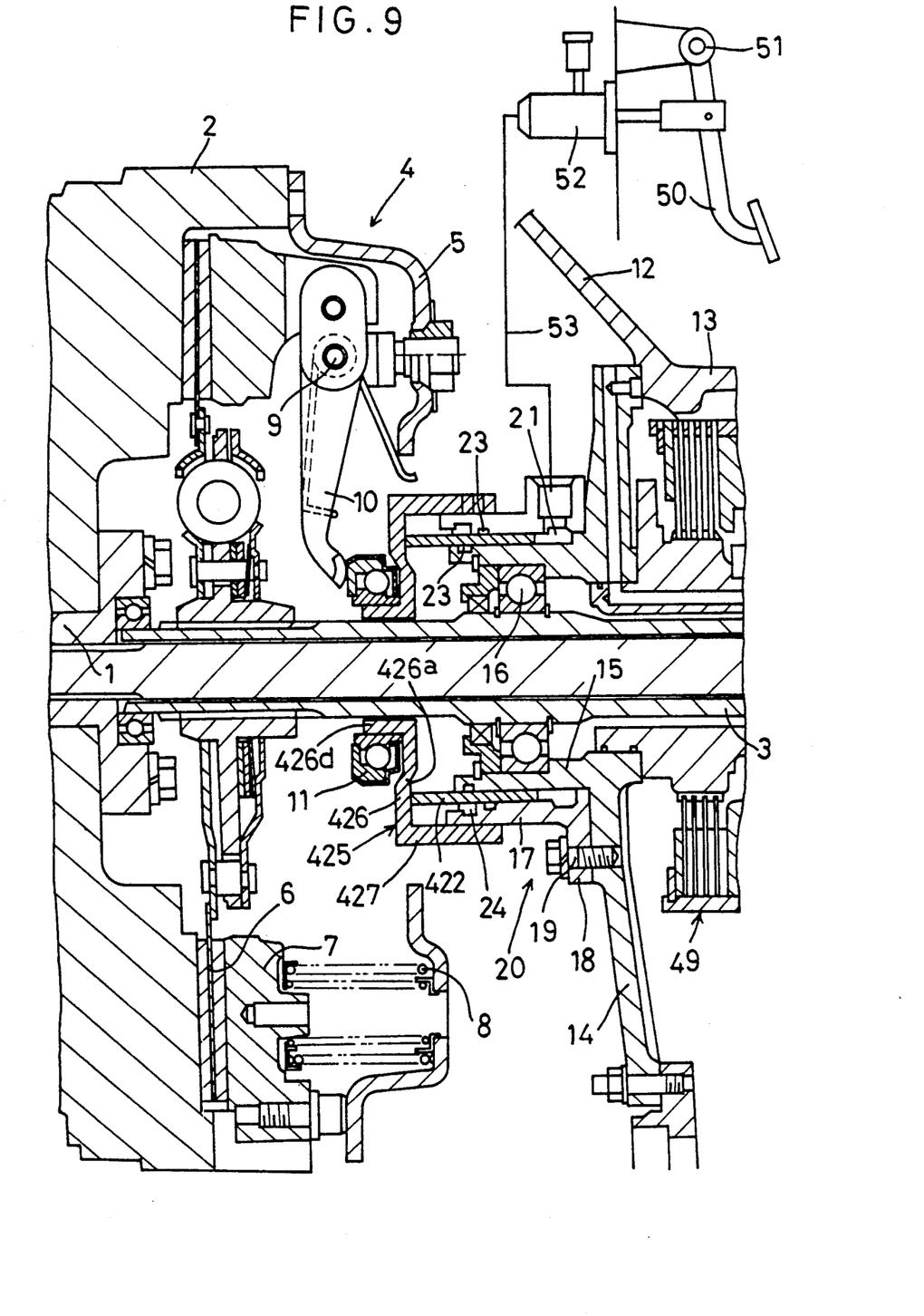
FIG. 9 is a view in vertical section of a hydraulic clutch operating apparatus in another embodiment of the present invention.

FIG. 9 shows a different hydraulic clutch operating apparatus having a simple construction for realizing the feature that the release hub divided from the piston slides on the outer surface of the outer sleeve 17 of the cylinder 20. In this sliding on the outer surface, the release hub has an increased sliding surface to promote sliding stability. To describe this embodiment in detail with reference to FIG. 9, a piston chamber 22 is defined between an inner sleeve portion 15 and an outer sleeve 17 constituting a cylinder 20 to be concentric with a propeller shaft 3. The piston chamber 22 has a tubular piston 422 axially slidably mounted therein. Slight spaces are formed inside and outside the piston 422, and these spaces are sealed by oil seals 23. Numeral 24 denotes a dust seal.

Numeral 425 denotes a tubular release hub having a bottom wall 426 defining a step 426a. The bottom wall 426 also includes a small diameter forward end 426d carrying a release bearing 11. The release hub 425 further includes a tubular portion 427 axially slidably fitted on the outer sleeve 17. The release hub 425 and piston 422 are formed separately from each other, and the release hub 425 is movable with pushing movement of the piston 422.

When a clutch pedal 50 is depressed, pressure oil is supplied from a master cylinder 52 to the piston chamber 21, whereby the piston 422 moves forward and pushes the release hub 425 forward. As a result, the release bearing 11 pushes forward inward ends of release levers 10, to place the clutch 4 in a half-clutch state or a disengaged state.

Figure 10:
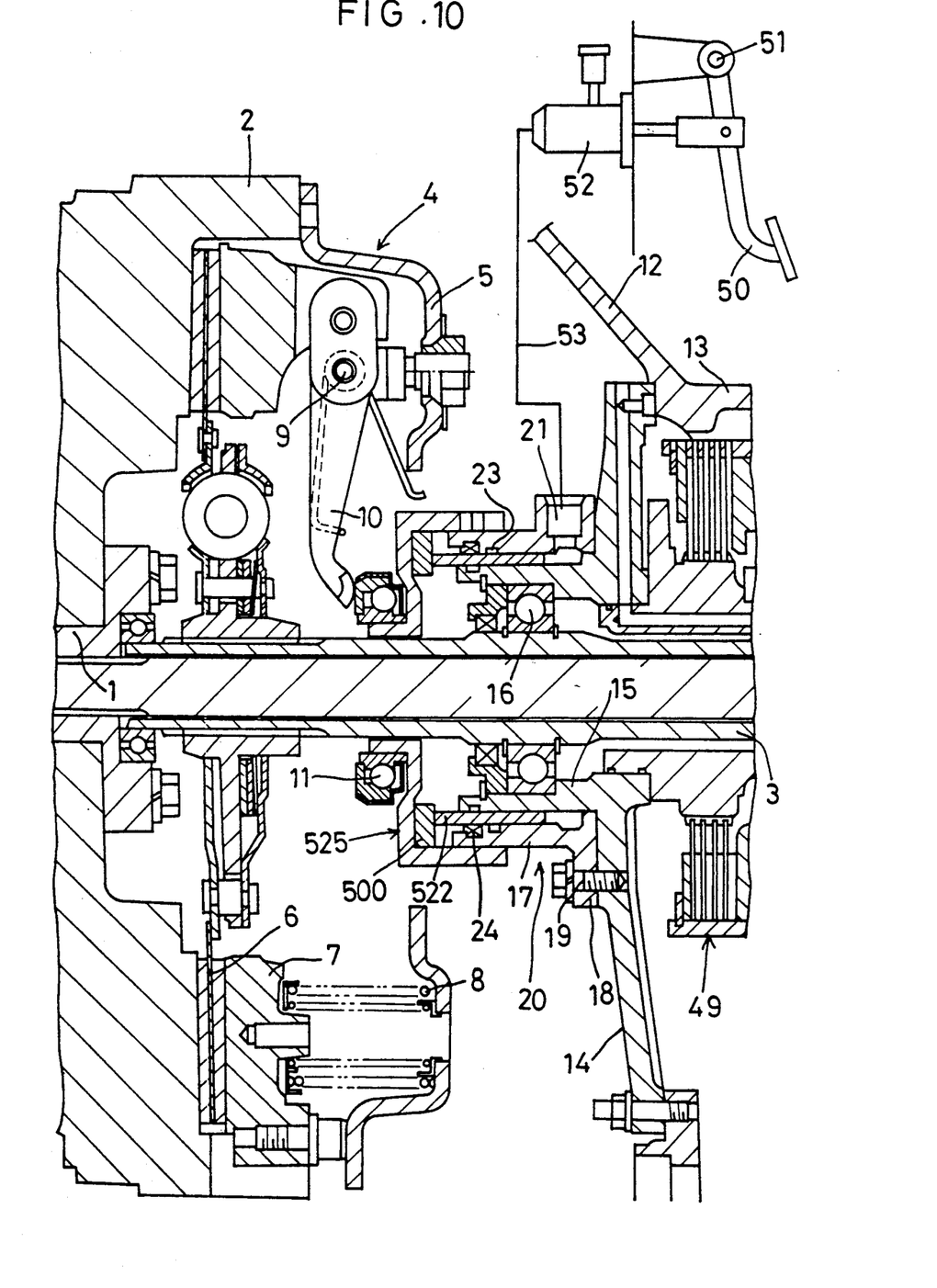
FIG. 10 is a view in vertical section of a hydraulic clutch operating apparatus in a further embodiment of the present invention.

FIG. 10 shows a hydraulic clutch operating apparatus in a further embodiment, in which the abutting plate and elastic element are combined. Specifically, a rubber ring 500 is disposed between a piston 522 and a release hub 525 to absorb movement of the release hub 525 transmitted to the piston 522. The rubber ring 500 is mounted in a corner region defined by a bottom wall and a side wall of the release hub 525. By selecting a thickness of the rubber ring 500, the piston 522 may be urged backward also when the clutch is out of operation (in the position shown in FIG. 10).

Figure 11:
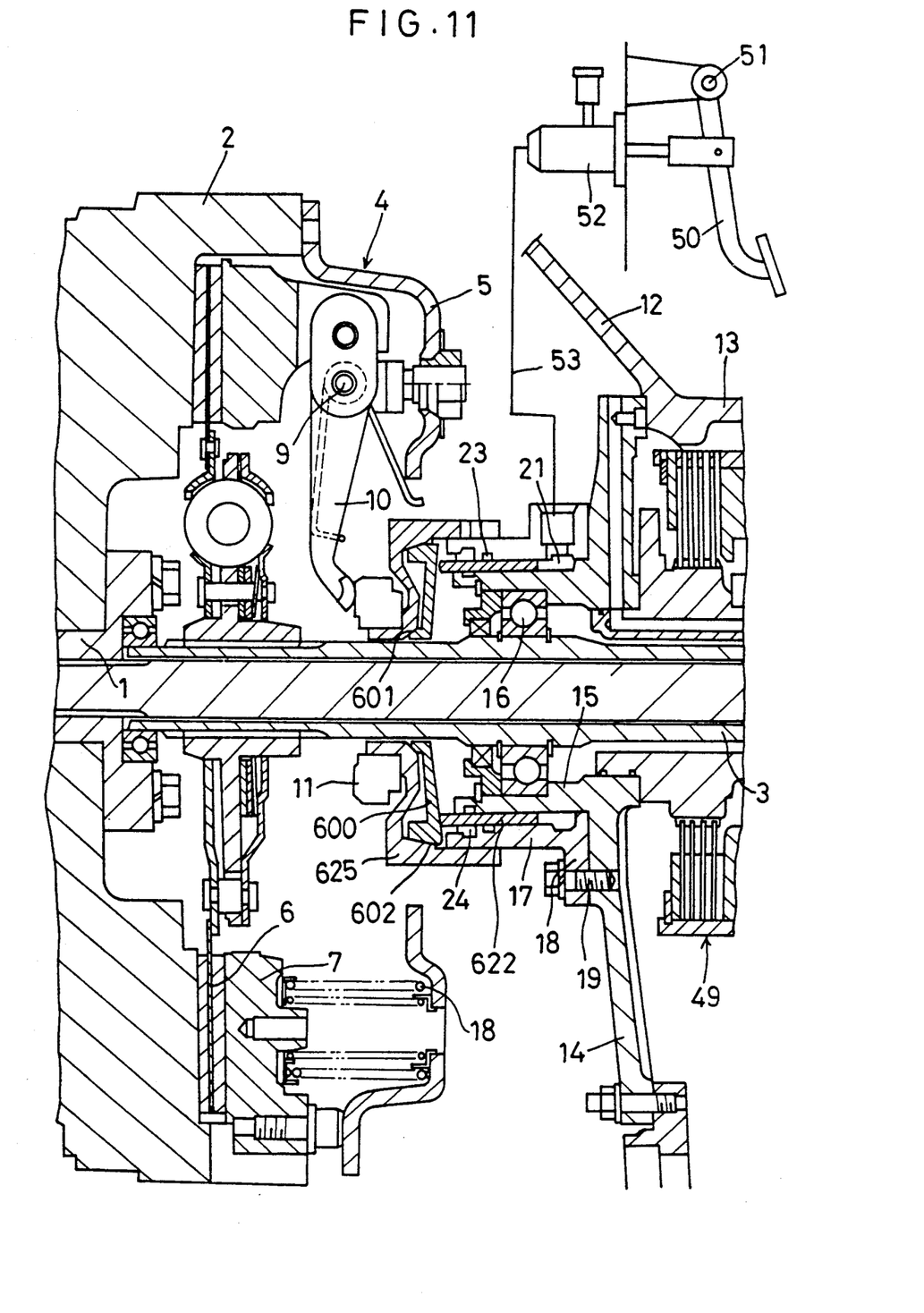
FIG. 11 is a view in vertical section of a hydraulic clutch operating apparatus in a still further embodiment of the present invention.

FIG. 11 shows a hydraulic clutch operating apparatus in a still further embodiment, in which spherical engaging surfaces are defined between the abutting plate and release hub. Specifically, a ring plate 600 acting as the abutting plate is disposed between a piston 622 and a release hub 625, and this ring plate 600 is shaped like a disc washer. The ring plate 600 and release hub 625 include inner and outer engaging portions 601 and 602 having spherical shapes.

In FIGS. 8 through 11, like reference numerals are affixed to like components with respect to the preceding embodiment, and these components are not described again to avoid repetition.

While, in all the embodiments described hereinbefore, the material for forming the abutting plate is not specified, a metal, particularly steel or spring steel, or engineering plastic may be employed.

What is claimed is:

1. A hydraulic operating apparatus for operating a clutch mounted in a clutch housing rotatably supporting a transmission shaft, comprising:
a tubular member surrounding said transmission shaft and fixed to said clutch housing, said tubular member including
an annular outer wall section extending axially, and
an annular inner wall section extending axially and defining an annular piston chamber with said outer wall section;
a tubular piston slidable in said piston chamber;
a release hub for supporting a clutch release bearing and receiving a pushing force of said piston, said release hub including
a peripheral wall,
a release bearing support, and
a bottom wall extending radially to connect said peripheral wall to said release bearing support;
a ring-shaped abutting plate disposed between a forward end of said piston and said release hub for absorbing shocks, said abutting plate including a first portion for transmitting and receiving forces to/from said piston, and a second portion for transmitting and receiving forces to/from said release hub, said first portion having a smaller diameter than said second portion; and
means for supplying a fluid pressure to said piston chamber.

2. A hydraulic operating apparatus as claimed in claim 1, wherein said peripheral wall of said release hub is slidable on an outer surface of said outer wall section.

3. A hydraulic operating apparatus as claimed in claim 2, wherein said release bearing support has a bearing supporting surface having a smaller diameter than said annular inner wall section.

4. A hydraulic operating apparatus as claimed in claim 1, wherein said abutting plate is formed of an elastic material.

5. A hydraulic operating apparatus as claimed in claim 1, wherein said abutting plate includes an axially stepped portion for axially offsetting said first portion relative to said second portion.

6. A hydraulic operating apparatus as claimed in claim 1, wherein engaging portions of said first portion and said release hub and engaging portions of said second portion and said release hub are formed as spherical contacting surfaces.

7. A hydraulic operating apparatus as claimed in claim 1, further comprising a first elastic element disposed between said first portion and said release hub.

8. A hydraulic operating apparatus as claimed in claim 1, further comprising a second elastic element disposed between said second portion and said release hub.

9. A hydraulic operating apparatus as claimed in claim 1, further comprising a first elastic element disposed between said first portion and said release hub, and a second elastic element disposed between said second portion and said release hub.

10. A hydraulic operating apparatus as claimed in claim 9, wherein said first elastic element is compressible between said first portion and said release hub when said piston is retracted to a critical extent, said second elastic element being compressible between said second portion and said release hub only when said piston is extended.

11. A hydraulic operating apparatus as claimed in claim 1, further comprising guide means disposed between said release hub and said abutting plate for guiding mutual axial movement thereof.

12. A hydraulic operating apparatus as claimed in claim 1, wherein said bottom wall of said release hub includes an inward portion continuous with said bearing support, an outward portion continuous with said peripheral wall, and a stepped portion between said outward portion and said inward portion for axially offsetting said outward portion toward said clutch relative to said inward portion, at least part of said release bearing being fitted in a space defined by said bearing support and said inward portion.

* * * * *